US010533537B2

(12) United States Patent
GilroySmith et al.

(10) Patent No.: US 10,533,537 B2
(45) Date of Patent: *Jan. 14, 2020

(54) AIRBORNE WIND TURBINE TETHER TERMINATION SYSTEMS

(71) Applicant: Makani Technologies LLC, Alameda, CA (US)

(72) Inventors: Bryan Christopher GilroySmith, Mountain View, CA (US); Brian Hachtmann, Mountain View, CA (US); Elias Wolfgang Patten, Mountain View, CA (US)

(73) Assignee: Makani Technologies LLC, Alameda, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/714,128

(22) Filed: Sep. 25, 2017

(65) Prior Publication Data

US 2018/0030960 A1 Feb. 1, 2018

Related U.S. Application Data

(63) Continuation of application No. 14/513,119, filed on Oct. 13, 2014, now Pat. No. 9,771,925.

(51) Int. Cl.
*F03D 13/20* (2016.01)
*F03D 1/02* (2006.01)
(Continued)

(52) U.S. Cl.
CPC .............. *F03D 13/20* (2016.05); *F03D 1/02* (2013.01); *F03D 9/255* (2017.02); *F03D 80/70* (2016.05);
(Continued)

(58) Field of Classification Search
CPC .................................. F03D 80/11; F03D 9/11
(Continued)

(56) References Cited

U.S. PATENT DOCUMENTS

| 4,323,722 A | 4/1982 | Winkelman |
| 5,274,725 A | 12/1993 | Bottoms et al. |

(Continued)

FOREIGN PATENT DOCUMENTS

WO 2012012429 A1 1/2012

OTHER PUBLICATIONS

International Searching Authority, International Search Report and Written Opinion dated Dec. 21, 2016, issued in connection with PCT/US2015/055170, filed on Oct. 12, 2015, 15 pages.

*Primary Examiner* — Christopher P Ellis
(74) *Attorney, Agent, or Firm* — McDonnell Boehnen Hulbert & Berghoff LLP (57) ABSTRACT

An Airborne Wind Turbine ("AWT") may be used to facilitate conversion of kinetic energy to electrical energy. An AWT may include an aerial vehicle that flies in a path to convert kinetic wind energy to electrical energy. The aerial vehicle may be tethered to a ground station with a tether that terminates at a tether termination mount. In one aspect, the tether has a core and at least one electrical conductor. The tether core may be terminated at a first location in a tether termination mount along an axis of the termination mount, and the at least one electrical conductor may be terminated at a second location in the tether termination mount along the same axis that the core is terminated. This termination configuration may focus tensile stress on the tether to the tether core, and minimize such stress on the at least one electrical conductor during aerial vehicle flight.

5 Claims, 9 Drawing Sheets

(51) Int. Cl.
*F03D 80/70* (2016.01)
*F03D 9/25* (2016.01)

(52) U.S. Cl.
CPC ....... *F05B 2240/921* (2013.01); *Y02E 10/728* (2013.01)

(58) Field of Classification Search
USPC ...................................................... 244/153 R
See application file for complete search history.

(56) References Cited

U.S. PATENT DOCUMENTS

| | | | |
|---|---|---|---|
| 6,254,034 B1* | 7/2001 | Carpenter | A63H 27/08 244/153 R |
| 6,325,330 B1 | 12/2001 | Lavan | |
| 6,859,590 B1 | 2/2005 | Zaccone et al. | |
| 7,752,830 B2 | 7/2010 | Goldwater et al. | |
| 8,350,403 B2* | 1/2013 | Carroll | B64C 39/022 290/55 |
| 8,653,369 B2 | 2/2014 | Hui et al. | |
| 9,211,951 B2* | 12/2015 | Hachtmann | B64C 39/022 |
| 9,214,022 B1* | 12/2015 | Hallamask | B64F 1/02 |
| 9,378,865 B2* | 6/2016 | Broughton, Jr. | H01B 7/043 |
| 2007/0126241 A1 | 6/2007 | Olson | |
| 2007/0176432 A1 | 8/2007 | Rolt | |
| 2008/0048453 A1* | 2/2008 | Amick | B82Y 30/00 290/44 |
| 2009/0091136 A1 | 4/2009 | Viterna | |
| 2009/0289148 A1* | 11/2009 | Griffith | B63H 9/0685 244/155 R |
| 2010/0032948 A1* | 2/2010 | Bevirt | F03D 1/00 290/44 |
| 2010/0290839 A1* | 11/2010 | Meller | B63B 21/26 405/228 |
| 2010/0295320 A1* | 11/2010 | Bevirt | B64C 39/022 290/55 |
| 2011/0101692 A1 | 5/2011 | Bilaniuk | |
| 2011/0121570 A1* | 5/2011 | Bevirt | F03D 5/06 290/44 |
| 2011/0266809 A1* | 11/2011 | Calverley | F03D 5/00 290/55 |
| 2012/0070122 A1* | 3/2012 | Lind | F03D 5/00 385/103 |
| 2012/0104763 A1* | 5/2012 | Lind | B64C 31/06 290/55 |
| 2012/0256423 A1 | 10/2012 | Liu | |
| 2013/0207397 A1 | 8/2013 | Bosman et al. | |
| 2014/0183300 A1 | 7/2014 | MacCulloch et al. | |
| 2014/0246862 A1* | 9/2014 | Garcia-Sanz | F03D 3/002 290/55 |
| 2014/0377066 A1* | 12/2014 | Anderson | F03D 1/065 416/44 |
| 2015/0188367 A1* | 7/2015 | Vander Lind | H02K 1/30 290/55 |

* cited by examiner

AIRBORNE WIND TURBINE TETHER
TERMINATION SYSTEMS

RELATED APPLICATION

This application claims priority to co-owned U.S. patent application Ser. No. 14/513,119, filed Oct. 13, 2014, now pending, the contents of which are incorporated by reference herein for all purposes.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers is significant.

An alternative to the costly wind turbine towers that may be used to harness wind energy is the use of an aerial vehicle that is attached to a ground station with an electrically conductive tether. Such an alternative may be referred to as an Airborne Wind Turbine (AWT).

SUMMARY

The present disclosure generally relates to tether termination systems and methods that may be used in an Airborne Wind Turbine (AWT) that includes an aerial vehicle attached to a ground station by an electrically conductive tether. In particular, the present disclosure relates to tether termination systems and methods that may be used in an AWT to facilitate the termination of an electrically conductive tether at a ground station and/or at the aerial vehicle. The systems and methods disclosed herein may help to avoid subjecting the electrical conductors of the tether to damaging stresses during, for example, flight of the aerial vehicle.

In one aspect, a tether termination system is provided that includes (i) a tether having a core and at least one electrical conductor, and (ii) a tether termination mount having a rotatable termination anchor, wherein the termination anchor is coupled to the tether, wherein the core of the tether is secured in a cavity of the termination anchor at a first location, wherein the at least one electrical conductor of the tether is secured in the cavity of the termination anchor at a second location, and wherein the core of the tether and the at least one electrical conductor of the tether may rotate within the cavity of the termination anchor about an axis of the termination anchor. The first location may be proximal to the second location. The core of the tether may enter the cavity of the termination anchor at a proximal end of the termination anchor, and the at least one electrical conductor of the tether may enter the cavity of the termination anchor on a lateral surface of the termination anchor. When the tether is under tension, the core of the tether may bear a greater tensile stress than the at least one electrical conductor. The tether termination mount may be part of a ground station of an airborne wind turbine, wherein the tether connects an aerial vehicle to the ground station via the tether termination mount. The tether may have at least two electrical conductors, and the at least two electrical conductors may be spliced together inside the cavity of the termination anchor. The core and the at least one electrical conductor of the tether may both be secured in the cavity of the termination anchor along the axis of the termination anchor.

In another aspect, a tether termination system is provided that includes (i) a tether having a core and at least one electrical conductor, wherein the core and the at least one electrical conductor are in contact for a first, proximal portion of the tether and not in contact for a second, distal portion of the tether, and (ii) a tether termination mount having a rotatable termination anchor, wherein the termination anchor is coupled to the second, distal portion of the tether, wherein the core of the second, distal portion of the tether is secured in a cavity of the termination anchor at a first location, wherein the at least one electrical conductor of the second, distal portion of the tether is secured in the cavity of the termination anchor at a second location, and wherein the core and the at least one electrical conductor of the second, distal portion of the tether may rotate within the cavity of the termination anchor about an axis of the tether termination mount. The first location may be proximal to the second location. The core of the second, distal portion of the tether may enter the cavity of the termination anchor at a proximal end of the termination anchor, and the at least one electrical conductor of the second, distal portion of the tether may enter the cavity of the termination anchor on a lateral surface of the termination anchor. When the tether is under tension, the core of the tether may bear a greater tensile stress than the at least one electrical conductor. The tether termination mount may be part of a ground station of an airborne wind turbine, wherein the tether connects an aerial vehicle to the ground station via the tether termination mount. The tether may have at least two electrical conductors, and the at least two electrical conductors may be spliced together inside the cavity of the termination anchor. The core and the at least one electrical conductor of the tether may both be secured in the cavity of the termination anchor along the axis of the termination anchor.

In a another aspect, an airborne wind turbine is provided that includes (i) an aerial vehicle, (ii) a tether having a core and at least one electrical conductor, wherein the tether is coupled to the aerial vehicle, and (iii) a ground station comprising a tether termination mount comprising a rotatable termination anchor, wherein the tether is coupled to the ground station via the termination anchor, wherein the core of the tether is secured along an axis of the termination anchor at a first location, and wherein the at least one electrical conductor of the tether is secured along the axis of the termination anchor at a second location. The first location may be proximal to the second location. The first location and the second location may be inside a cavity of the termination anchor. The core of the tether may enter the cavity of the termination anchor at a proximal end of the termination anchor, and the at least one electrical conductor of the tether may enter the cavity of the termination anchor on a lateral surface of the termination anchor. When the tether is under tension, the core of the tether bears a greater tensile stress than the at least one electrical conductor These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed methods and systems can be arranged and combined in a wide variety of different configurations, all of which are contemplated herein.

Furthermore, all of the Figures described herein are representative only and the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. OVERVIEW

Wind energy systems, such as an Airborne Wind Turbine (AWT), may be used to convert wind energy to electrical energy. An AWT is a wind based energy generation device that may include an aerial vehicle that is attached to a ground station by an electrically conductive tether. The aerial vehicle may be constructed of a rigid wing with a plurality of mounted turbines. The aerial vehicle may be operable to fly in a path across the wind, such as a substantially circular path above the ground (or water) to convert kinetic wind energy to electrical energy. In such crosswind flight, the aerial vehicle may fly across the wind in a circular pattern similar to the tip of a wind turbine blade. The turbines attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to a grid.

When it is desired to land the aerial vehicle, the electrically conductive tether may be wound onto a spool or drum on the ground station and the aerial vehicle may be reeled in towards a perch on the ground station. Prior to landing on the perch, the aerial vehicle transitions from a flying mode to a hover mode. The drum may be further rotated to further wind the tether onto the drum until the aerial vehicle comes to rest on the perch.

The electrically conductive tether may be configured to withstand one or more forces of the aerial vehicle when the aerial vehicle is in flight mode (e.g., takeoff, landing, hover flight, forward flight, and/or crosswind flight). As such, the tether may include a core constructed of high strength fibers. In addition to transmitting electrical energy generated by the aerial vehicle to the ground station, as noted above, the tether may also be used to transmit electricity from the ground station to the aerial vehicle in order to power the aerial vehicle during operation. Accordingly, the tether may also include one or more electrical conductors for the transmission of electrical energy generated by the aerial vehicle and/or transmission of electricity to the aerial vehicle. In some embodiments, the tether may include a plurality of insulated electrical conductors that surround the tether core. In some embodiments, the tether may also include one or more optical conductors for the transmission of data to and from the aerial vehicle.

As the aerial vehicle flies across the wind in a substantially circular path, the tether may continuously rotate in one direction about a central tether axis. Consequentially, a tether termination system may be provided at the ground station that allows for tether rotation. Such a tether termination system may avoid twisting of the tether, which could, among other things, damage the electrical conductors of the tether. In one embodiment disclosed herein, a tether termination system is provided that includes a termination anchor that receives the tether and that is configured to rotate during tether rotation. The tether termination system may also include a rotatable spindle connected to the termination anchor.

While the aerial vehicle is in flight, the tether may also be under tension, which could also damage the electrical conductors of the tether. Accordingly, it may be desirable not only to terminate the tether in a manner that prevents twisting of the tether during tether rotation, as described above, but also to focus any tensile stress on the tether to the tether core, and to minimize such stress on the electrical conductors. As described in more detail below, in one embodiment disclosed herein, this may be achieved by terminating the tether core at a first location in a tether termination mount along an axis of the termination mount, and terminating the electrical conductors at a second location in the tether termination mount along the same axis that the core is terminated, where the first location is proximal to the second location.

As used herein, the terms "proximal" and "distal" refer to the location of elements relative to the center of the tether length (i.e., the midpoint of the tether between the ground station and aerial vehicle); "proximal" being closer to the center of the tether and "distal" being further from the center of the tether.

II. ILLUSTRATIVE AIRBORNE WIND TURBINES

Figure 1:
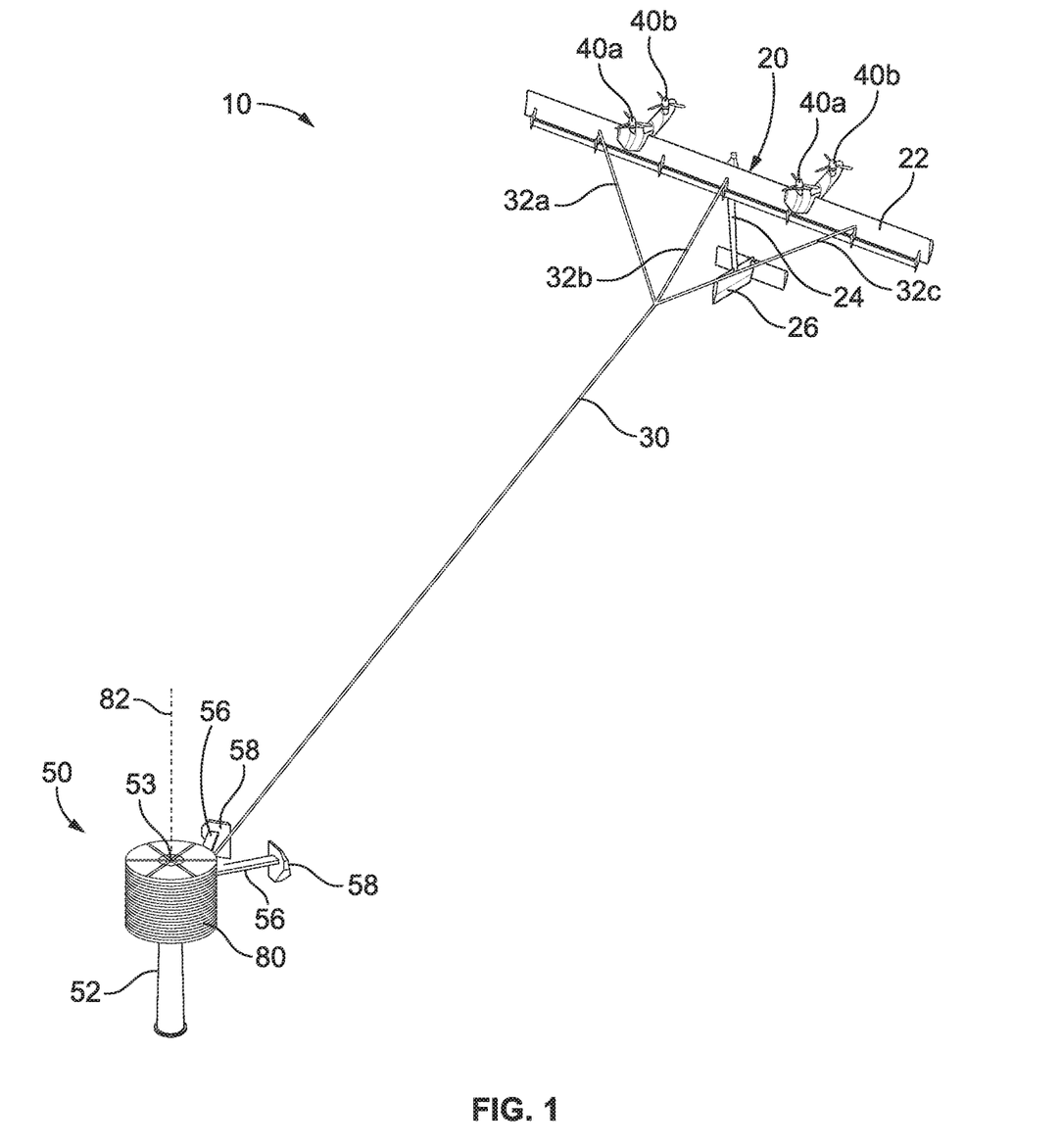
FIG. 1 is a perspective view of an exemplary airborne wind turbine 10 in a flying mode, including an aerial vehicle 20 attached to a ground station 50 by a tether 30.
Figure 2:
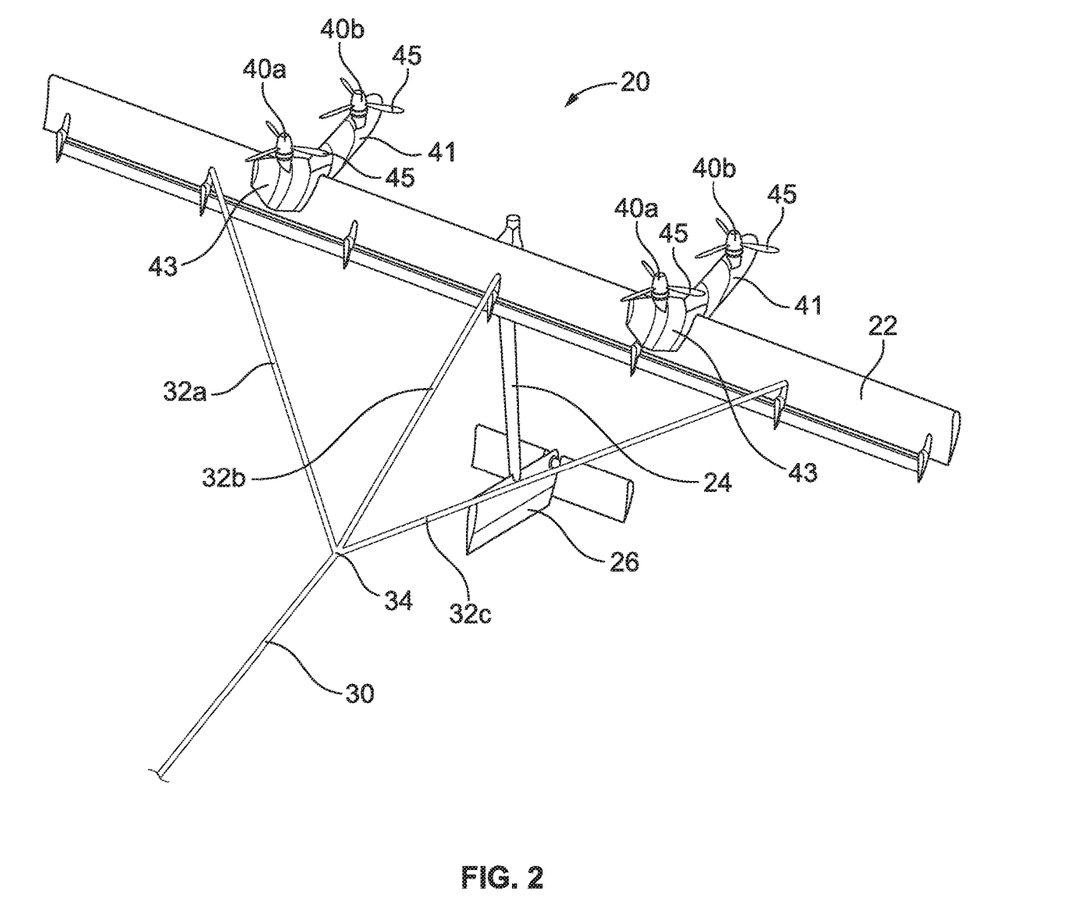
FIG. 2 is a close-up perspective view of the aerial vehicle 20 shown in FIG. 1.

As disclosed in FIGS. 1-2, an Airborne Wind Turbine (AWT) 10 is disclosed, according to an example embodiment. AWT 10 is a wind based energy generation device that includes an aerial vehicle 20 constructed of a rigid wing 22 with mounted turbines (or rotors) 40a and 40b that flies in a path, such as a substantially circular path, across the wind. In an example embodiment, the aerial vehicle 20 may fly between 250 and 600 meters above the ground (or water) to convert kinetic wind energy to electrical energy. However, an aerial vehicle 20 may fly at other heights without departing from the scope of the invention. In crosswind flight, the aerial vehicle 20 flies across the wind in a circular pattern similar to the tip of a wind turbine. The rotors 40a and 40b attached to the rigid wing 22 are used to generate power by slowing the wing 22 down. Air moving across the turbine blades 45 forces them to rotate, driving a generator (not shown) to produce electricity. The aerial vehicle 20 is connected to a ground station 50 via an electrically conductive tether 30 that transmits power generated by the aerial vehicle 20 to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, e.g., at a tether termination mount (not shown). The tether 30 may be attached to the aerial vehicle 20 at three locations on the aerial vehicle 20 using bridal 32a, 32b, and 32c. However, in other examples, the tether 30 may be attached at a single location or multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 80 rotatable about drum axis 82 that is used to reel in aerial vehicle 20 by winding the tether 30 onto the rotatable drum 80. In this example, the drum 80 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 80, and the aerial vehicle 20 is reeled in towards the ground station 50, the aerial vehicle 20 may come to rest upon perch panels 58. The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform or a boat, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. Further, the tether 30 may transmit data between the aerial vehicle 20 and ground station 50. The tether 30 may be constructed in any form and using any material that may allow for the transmission, delivery, and/or harnessing of electrical energy generated by the aerial vehicle 20 and/or transmission of electricity to the aerial vehicle 20. For example, the tether 30 may include one or more electrical conductors. The tether 30 may also be constructed of a material that allows for the transmission of data to and from the aerial vehicle 20. For example, the tether may also include one or more optical conductors.

The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

Figure 5:
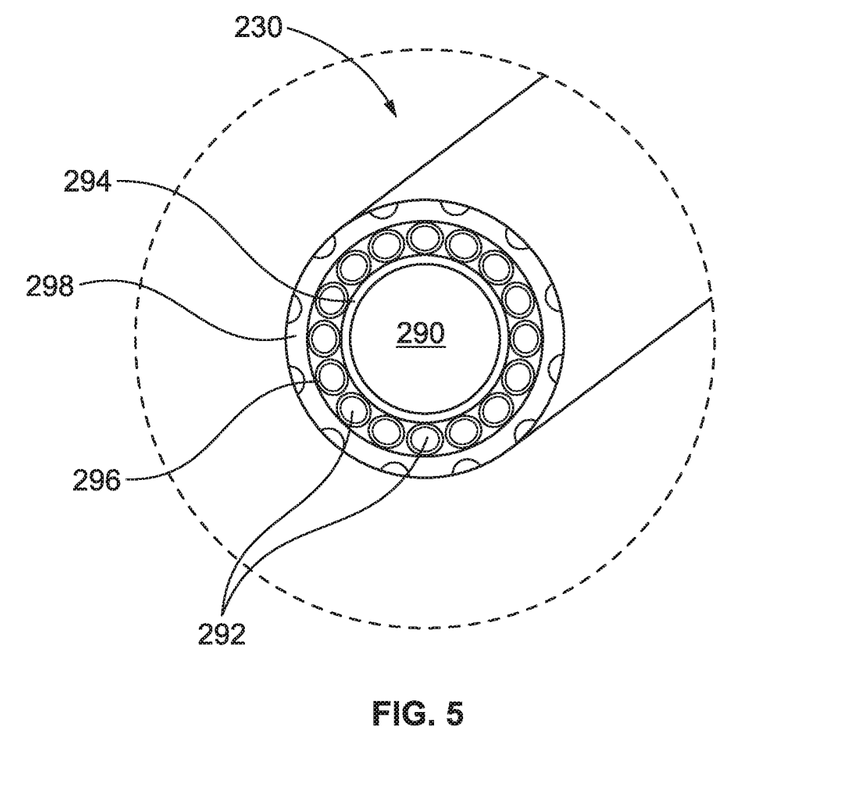
FIG. 5 is a cross-sectional view of an exemplary tether 230, including electrical conductors 292 surrounding a core 290.

In one embodiment of the tether, as shown in the cross-sectional view of FIG. 5, the tether 230 may include a central high-strength core 290 surrounded by a plurality of electrical conductors 292. The core 290 may comprise a single strand or multiple strands that are helically wound along the length of the core 290. In one embodiment, the high-strength core 290 is comprised of multiple composite rods having fibrous elements such as aramid fibers, carbon fibers, or glass fibers, and a constraining matrix element such as an epoxy matrix or a vinyl ester matrix. In another embodiment, the high-strength core 290 is comprised of dry fibers, metal wire, or metal cable rather than composite rods. The tether core 290 may be coated with a bonding layer 294 and each of the electrical conductors 292 may be provided with an insulation jacket 296. An outer sheath 298 may also provided. Surrounding the tether core 290 with the electrical conductors 292, as opposed to running the conductors through the center of the core, may be desirable because, among other things, it may increase the cooling capacity of the electrical conductors. In some embodiments, one or more of the electrical conductors may be replaced with one or more optical conductors.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material that allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form that allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the lower rotors 40a to the main wing 22, and rotor connectors 41 may be used to connect the upper rotors 40b to the main wing 22. In some examples, the rotor connectors 43 and 41 may take the form of or be similar in form to one or more pylons. In this example, the rotor connectors 43 and 41 are arranged such that the lower rotors 40a are positioned below the wing 22 and the upper rotors 40b are positioned above the wing 22. In another example, illustrated in FIGS. 3-4, rotor connectors 141 and 143 may form a single pylon that may be attached to the underside of the main wing 122. In such an embodiment, rotor connectors 143 and 141 may still be arranged such that the lower rotors 140a are positioned below the wing 122 and the upper rotors 140b are positioned above the wing 122.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 80 is rotated to reel in the aerial vehicle 20 towards the perch panels 58 on the ground station 50, and the electrically conductive tether 30 is wound onto drum 80. Prior to landing on the perch panels 58, the aerial vehicle 20 transitions from a flying mode to a hover mode. The drum 80 is further rotated to further wind the tether 30 onto the drum 80 until the aerial vehicle 20 comes to rest on the perch panels 58. Although shown as two separate perch panels 58 in this example, other examples may include a single perch panel or greater than two perch panels.

Figure 3:
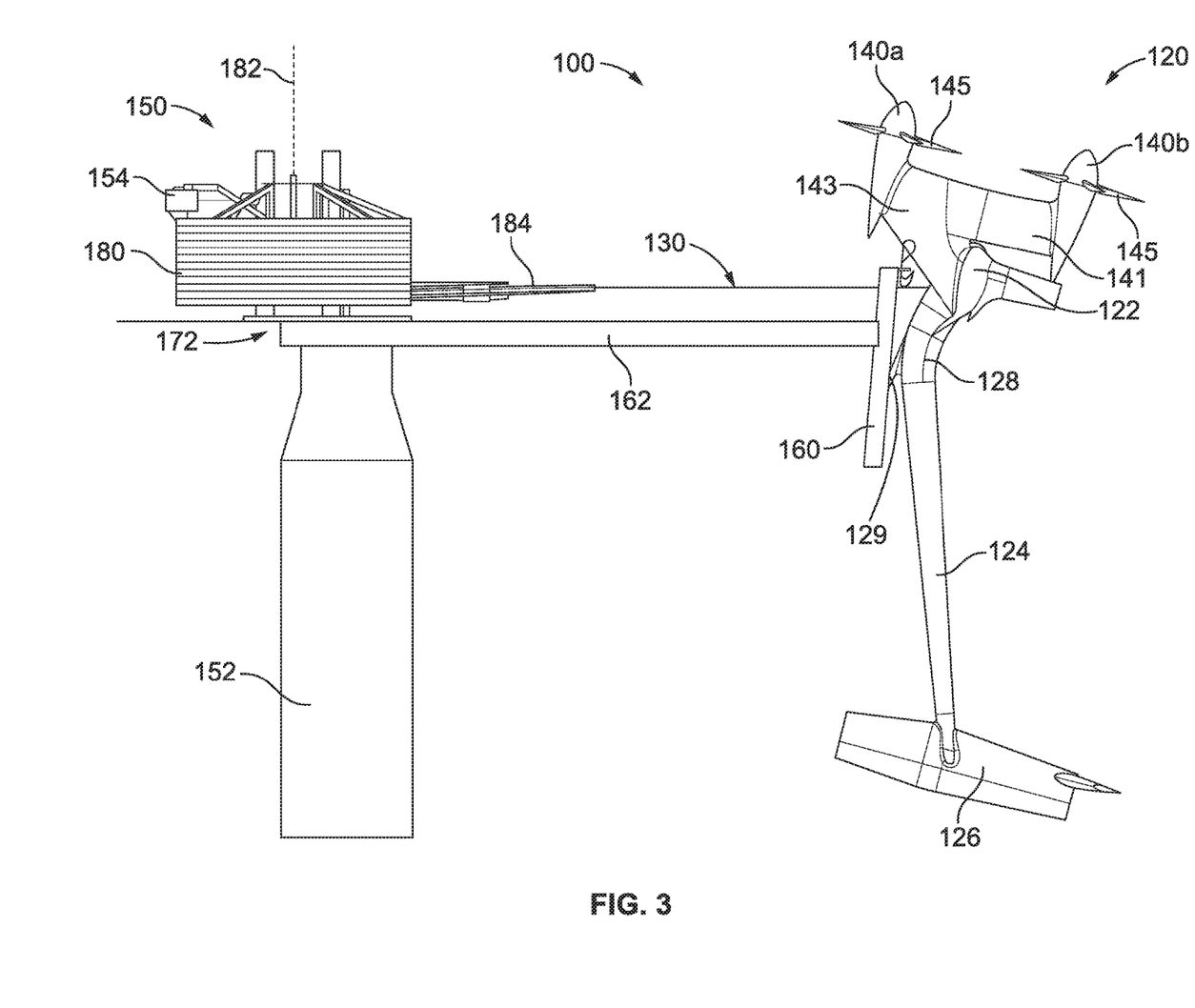
FIG. 3 is a side view of an exemplary airborne wind turbine 100 in a non-flying perched mode, including an aerial vehicle 120 attached to a ground station 150 by a tether 130, where the aerial vehicle 120 is perched on a perch panel 160 of the ground station 150.
Figure 4:
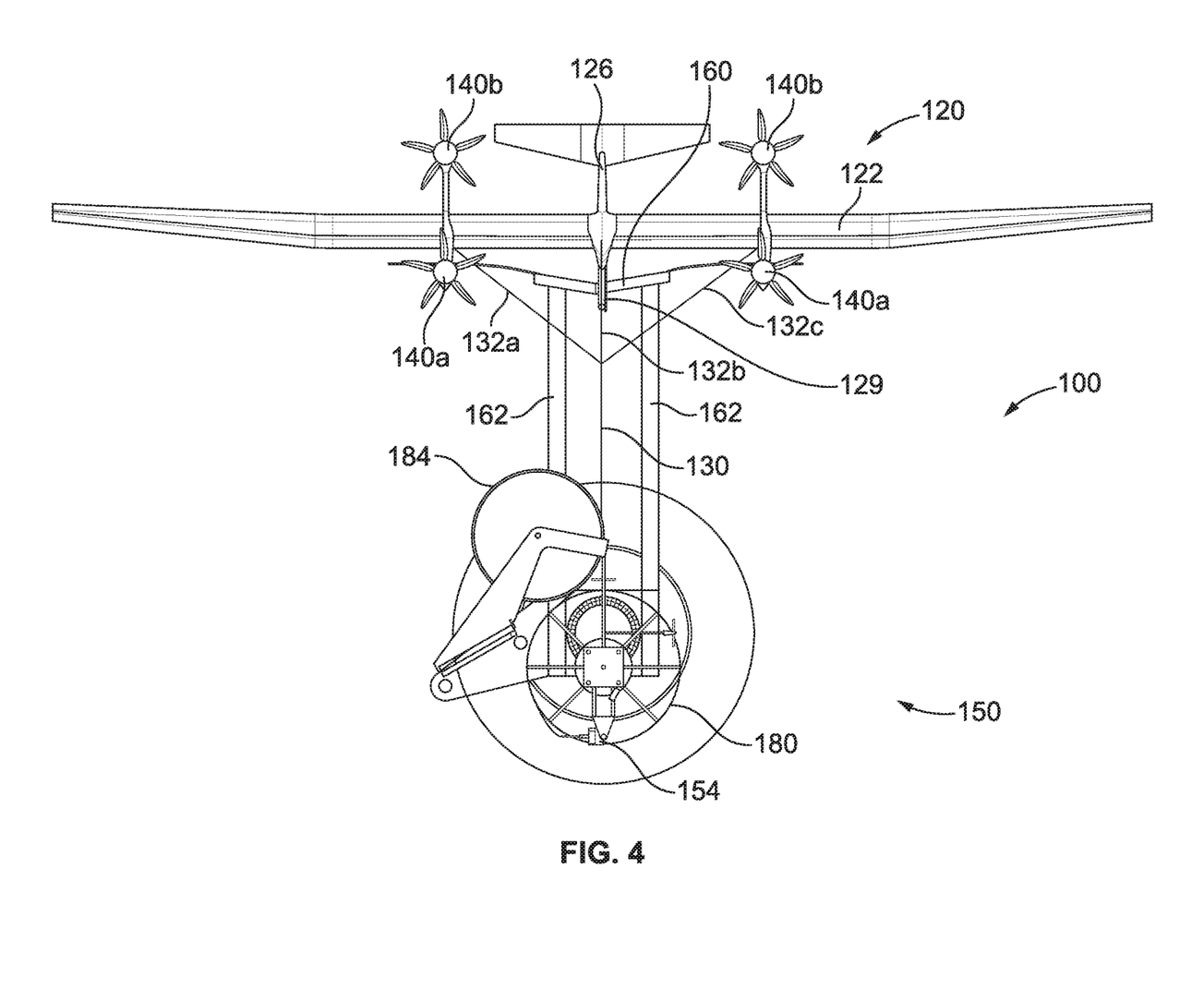
FIG. 4 is a top view of the airborne wind turbine 100 shown in FIG. 3.

FIG. 3 is a side view of an airborne wind turbine 100, according to an example embodiment. As shown, airborne wind turbine 100 includes aerial vehicle 120 perched on perch panel 160 of ground station 150. FIG. 4 is a top view of the aerial vehicle 120 and ground station 150 shown in FIG. 3, according to an example embodiment. In FIGS. 3 and 4, ground station 150 includes a tower 152 upon which rotatable drum 180 and levelwind 184 are positioned. In an embodiment, the tower 152 may be 15 meters in height. In this perched mode, electrically conductive tether 130 is wrapped around drum 180 and extends from the levelwind 184, and is attached to wing 122 of aerial vehicle 120 using bridle lines 132a, 132b, and 132c. In one embodiment the bridle lines 132a, 132b, and 132c may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132a and 132c to better clear a larger sized perch panel.

When the ground station 150 deploys (or launches) the aerial vehicle 120 for power generation via crosswind flight, the tether 130 may be unwound from the drum 180. In one example, one or more components of the ground station 150 may be configured to pay out the tether 130 until the tether 130 is completely unwound from the drum 180 and the aerial vehicle is in crosswind flight.

The perch panel 160 is supported by perch panel support members 162, which extend horizontally from a perch platform 172 of the ground station 150. The perch platform 172 may rotate about the top of the tower 152 so that the perch panel 160 is in proper position when the aerial vehicle is 120 is landing. Aerial vehicle 120 includes lower rotors 140a mounted on pylons 143 attached to the underside of wing 122 and upper rotors 140b mounted on pylons 141 that are attached to pylons 143. Rotors 140a and 140b may serve power-generating turbines. In an embodiment, wing 122 is 4 meters long. Aerial vehicle 120 includes a fuselage 124 and tail wing 126. As shown in FIG. 3, fuselage 124 has a curved section 128 from which a peg 129 extends. In a perched condition, as shown in FIGS. 3 and 4, peg 129 contacts and rests on perch panel 160.

Furthermore, when the aerial vehicle 120 is in hover mode during landing, the peg 129 extends downwardly and outwardly from the fuselage 124 towards the perch panel 160. As shown in FIG. 4, the perch panel 160 may be aligned with the tether 130 being guided through levelwind 184 and onto a rotatable drum 180 that rotates about an axis 182. In this manner, the perch panel 160 faces the fuselage 124 of the aerial vehicle 120 when it is landing. The drum 180 shown in FIGS. 3 and 4 has a vertical axis of rotation 182. However a horizontal drum or an angled drum could also be used. For example, if a drum rotatable about a horizontal axis is used, the perch panel support members 162 could be coupled to the drum such that the perch panel support members 162 extend perpendicularly from the axis of the drum and the tether 130 is wound onto the drum over the perch panel 160. In this manner as the tether 130 is wound onto the drum, the perch panel 160 will always face the aerial vehicle 120 and be in position to receive the peg 129 on the fuselage 124 of the aerial vehicle 120.

III. ILLUSTRATIVE SYSTEMS AND METHODS FOR TERMINATING A TETHER AT A TERMINATION MOUNT

Figure 6:
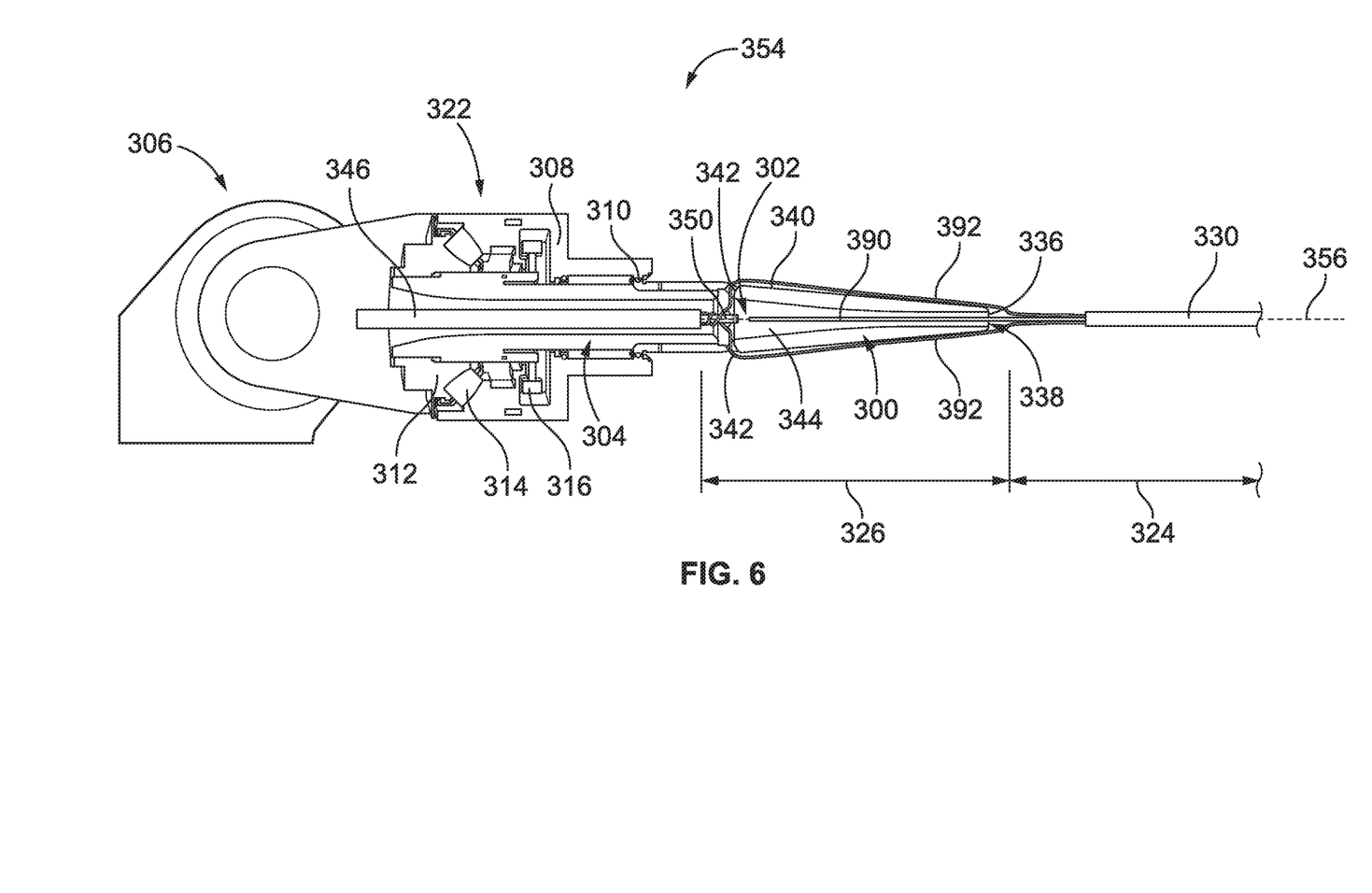
FIG. 6 is a cross-sectional view of an exemplary tether termination mount 354 for terminating a tether 330 at a ground station.
Figure 7:
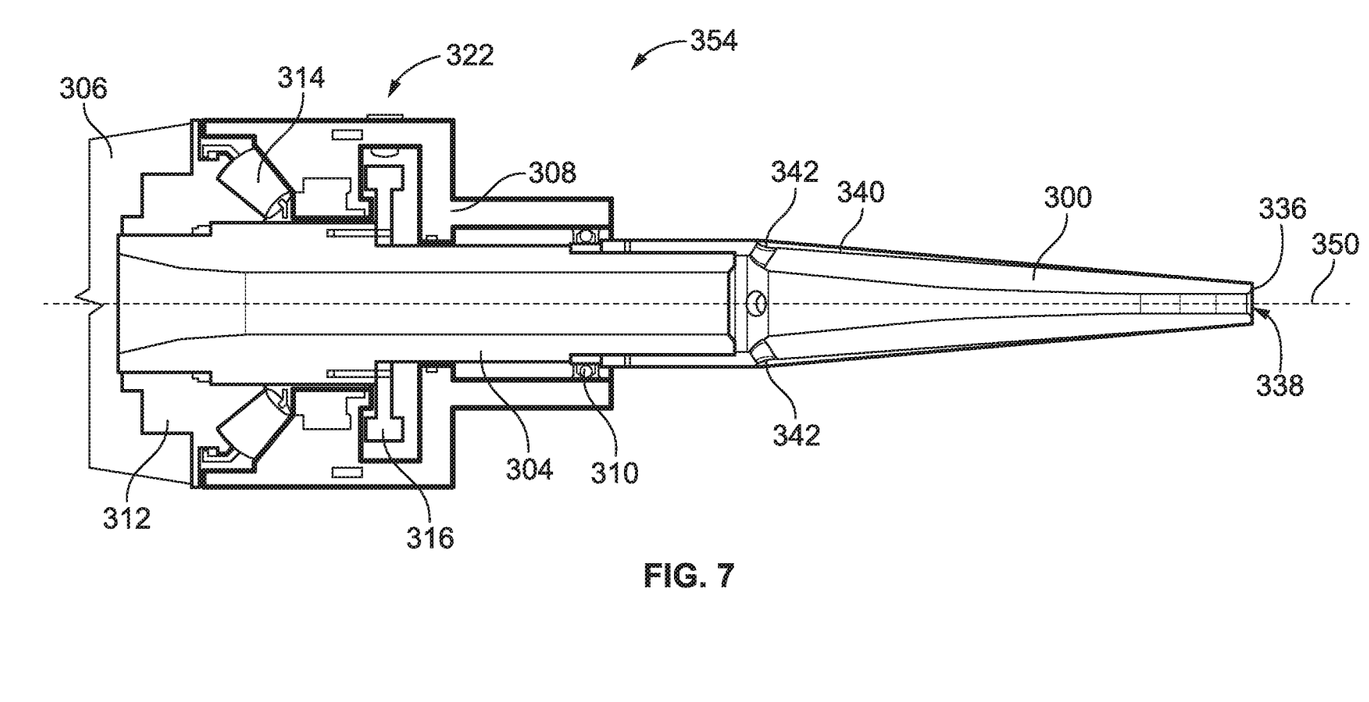
FIG. 7 is a close-up cross-sectional view of the tether termination mount 354 shown in FIG. 6.

FIGS. 6 and 7 illustrate cross sectional views of one embodiment of a tether termination mount 354 that may be used to connect a tether 330 (only shown in FIG. 6) to a ground station of an AWT, such as the exemplary AWTs illustrated in FIGS. 1-4. As shown, the tether termination mount 354 generally includes a termination anchor 300, a spindle 304, a gimbal assembly 306, and a bearing housing 308.

In this embodiment, the proximal portion of the termination anchor 300 generally takes the form of a hollow cone having a proximal end 336 and a lateral surface 340. The proximal end 336 of the termination anchor 300 may be provided with an opening 338 to a cavity 302, which also generally takes the form of a cone. In other embodiments, the termination anchor 300 and cavity 302 may take a different form. In addition, it should be noted that the cavity 302 of the termination anchor 300 does not necessarily have to track the geometry of the anchor 300. However, regardless of the general geometry of the anchor 300 and the cavity 302, it may be desirable for the cavity 302 to taper towards the proximal end 336 of the termination anchor 300. The cross section of the cavity 302 may be round (as shown in FIG. 6), rectangular, trapezoidal, elliptical, etc. The proximal opening 338 may be sized and shaped to receive the core 390 of the tether 330. The lateral surface 340 of the termination anchor 300 may be provided with a plurality of openings 342 that also provide access to the cavity 302. These openings 342 are sized and shaped to receive the electrical conductors 392 of the tether 330. As noted above, one or more of the electrical conductors 392 may be replaced with one or more optical conductors for the transmission of data. The embodiment shown has four openings 342, but any number of openings 342 may be possible. In one embodiment, the number of openings 342 may correspond to the number of electrical conductors 392 of the tether 300. However, in other embodiments, the number of electrical conductors 392 may be greater than the number of openings 342 and multiple conductors 392 may be routed through a single opening 342. The distal end portion of the termination anchor 300 may be generally cylindrical and configured to connect to the spindle 304. The termination anchor 300 and spindle 304 may be connected using any known technique in the art that prevents relative rotation therebetween, including, for example, rivets, screws, adhesive, weld, friction fit, snap fit, etc. Although the termination anchor 300 and spindle 304 are two separate components in the embodiment shown in FIG. 6, in other embodiments, the termination anchor 300 and spindle 304 may be a single member. As explained in more detail below, the termination anchor 300 may be configured to rotate about its axis 350.

Figure 8:
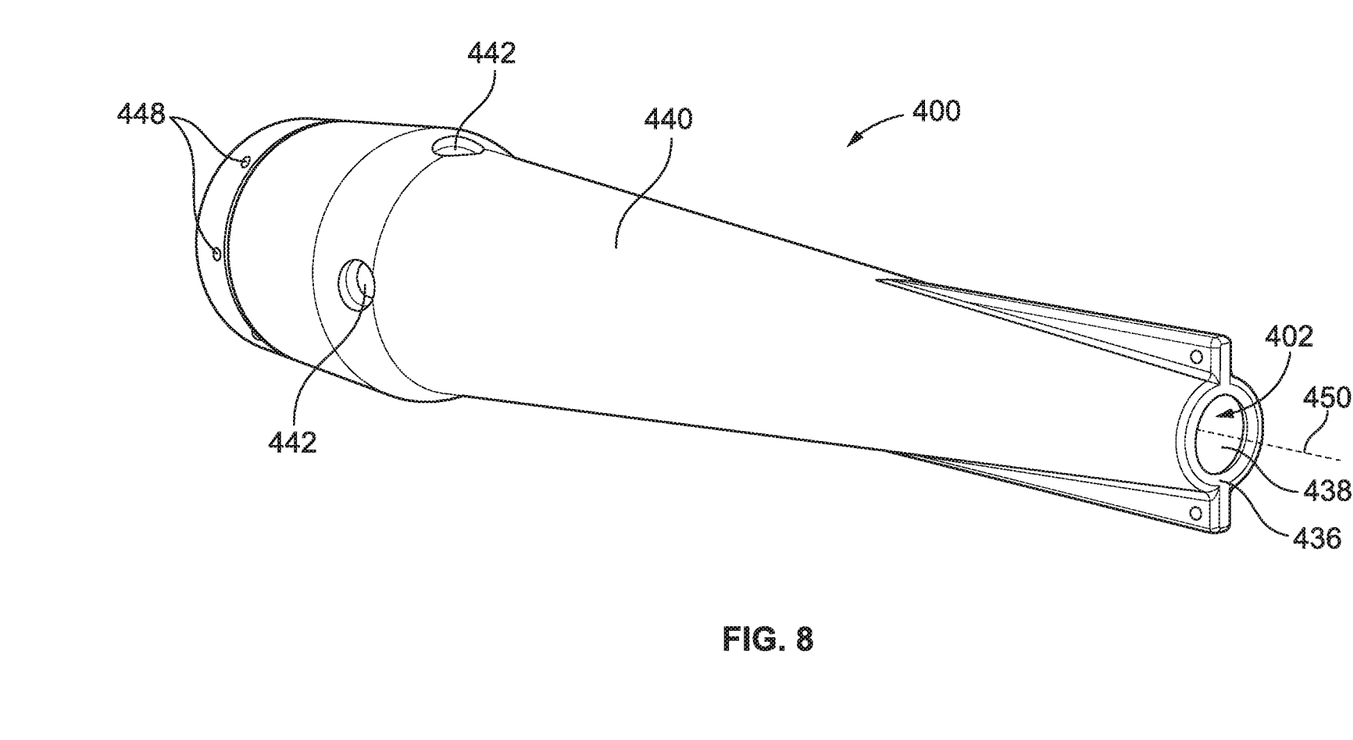
FIG. 8 is a perspective view of an exemplary tether termination anchor 400 that can be used in a tether termination mount for terminating a tether at a ground station.

FIG. 8 illustrates an isometric view of an exemplary termination anchor 400. The proximal end 436 of the termination anchor 400 may be provided with an opening 438 to a cavity 402. The lateral surface 440 of the termination anchor 400 may be provided with a plurality of openings 442 that also provide access to the cavity 402. In this embodiment, the plurality of openings 442 are equally spaced around the axis 450 of the termination anchor 400. However, in other embodiments, the plurality of openings 442 do not need to be equally spaced around the axis 450 of the termination anchor 400. The distal end of the termination anchor 400 may be configured to engage a proximal end of a spindle, such as spindle 304 shown in FIGS. 6-7. As shown, the distal end of the termination anchor includes a plurality of holes 448 for receiving fasteners used to secure the termination anchor 400 to a spindle.

Turning back to FIGS. 6-7, the spindle 304 generally takes the form of a hollow cylinder. As with the termination anchor 300, the spindle may also take a different form in other embodiments. The proximal end portion of the spindle 304 may be sized and shaped to fit within, and connect to the distal end portion of the termination anchor 300. In other embodiments, the proximal end portion of the spindle 304 may be sized and shaped to fit over the distal end portion of the termination anchor 300. The distal end portion of the spindle 304 may be coupled to the bearing assembly 322 such that the spindle 304 can rotate within the bearing assembly 322. Because the spindle 304 may be connected to the termination anchor 300 in a manner that prevents relative rotation therebetween, the termination anchor 300 and the spindle 304 may rotate together about their common axis 350.

As shown, the bearing assembly 322 of this embodiment includes a bearing housing 308, a front bearing 310, a rear bearing assembly 312, and a rear bearing 314. The front bearing 310 may be located toward the proximal end of the bearing housing 308 and may help to reduce friction between the inner surface of the bearing housing 308 and the outer surface of the spindle 304 during spindle/anchor rotation. As shown, the front bearing 310 may be located adjacent the distal end of the termination anchor 300. In other embodiments, the termination anchor 300 may extend further in the distal direction and the front bearings 310 may by used to reduce the friction between the inner surface of the bearing housing 308 and the outer surface of the anchor 300 during rotation. The rear bearing 314 also helps to facilitate spindle/anchor rotation. The rear bearing 314 may be located toward the distal end of the bearing housing 308. As shown, the rear bearing 314 may not in direct contact with the spindle 304. Rather, the rear bearing assembly 312 may be positioned between the spindle 304 and the rear bearing 314. In this embodiment, the rear bearing assembly 312 may be connected to the spindle 304 in a manner that does not permit relative rotation therebetween. Accordingly, the rear bearing assembly 312 may rotate with the spindle 304 and the termination anchor 300. In other embodiments, the rear bearing 314 may be in direct contact with the spindle 304. In addition to reducing friction, the combination of the front bearing 310 and the rear bearing 314 helps to ensure proper alignment of the spindle 304 and termination anchor 300 relative to the bearing housing 308. Tether termination mount 354 may also provided with a chain sprocket 316 that circumscribes a central portion of the spindle 304

The distal end of the bearing housing 308 may be coupled to the gimbal assembly 306, which in turn may be coupled to a ground station, such as ground stations 50 or 150 shown in FIGS. 1-4. The gimbal assembly 306 may include one or more gimbals. Each gimbal may provide structural support that allows the tether termination mount 354 to rotate about an axis. The gimbal assembly 306 may take the form of any gimbal assembly known in the art.

The manner in which the tether 330 may be terminated at the tether termination mount 354 will know be described with reference to FIG. 6. As shown, the tether 330 has a first, proximal portion 324 where the electrical conductors 392 surround, and are in contact with the tether core 390. An exemplary cross-sectional view of this tether arrangement is illustrated by the tether 230 shown in FIG. 5. By "in contact," it is meant that there is contact between the electrical conductors 292 and the core 290, either directly or indirectly via the insulation jacket 296 of the electrical conductors 292 and/or bonding layer 294 of the core 290. In other embodiments, additional layers may be present between the electrical conductors and the core. The tether 330 also has a second, distal portion 326 where the electrical conductors 392 and the core 390 are separated/not in contact. As shown, the electrical conductors 392 are separated from the core 390 just prior to reaching the proximal end 336 of the termination anchor 300. In other embodiments, the electrical conductors 392 may be separated from the core 390 at a more proximal location. A clamp feature may be provided at the point of separation to prevent unwanted separation between the electrical conductors 392 and the core 390 in the proximal direction.

The core 390 may then be routed through the proximal opening 338 of the termination anchor 300 and into the cavity 302 where it is terminated. More specifically, the core 390 may be held in the cavity 302 with a high-strength epoxy 344, which bonds to both the outer surface of the core 390 and the inner surface of the termination anchor 300. During manufacturing, the core 390 may be inserted into the cavity 302 through the proximal opening 338 and then epoxy 344 may be injected into the cavity 302. As the epoxy 344 sets, it assumes the cone shape of the proximal portion of cavity 302. This cone shape acts as a wedge that helps ensure that the core 390 cannot be pulled out of termination anchor 300 when the tether is under tension, e.g., when the aerial vehicle is in flight. Other methods for terminating the core 390 in the cavity 302 of the termination anchor 300 may also be used. As shown, the core 390 may be terminated within the cavity 302 along the termination anchor/spindle axis 350. Although not shown in FIG. 6, the portion of the core 390 that is secured within the cavity 302 of the termination anchor 300 may be split into multiple strands. Such a configuration may increase the surface area of the core 390 to which the epoxy can adhere.

Unlike the core 390, the electrical conductors 392 are not routed through the proximal opening 338 of the termination anchor 300 and into the cavity 302. Rather, the electrical conductors 392 are routed past the opening 338 and along the lateral surface 340 of the termination anchor 300. The electrical conductors 392 are then routed through the lateral openings 342 of the termination anchor 300 and into the cavity 302. The lateral openings 342 are located distal to the proximal opening 238. Additionally, in this embodiment, the electrical conductors 392 enter the cavity 302 at a location distal to the epoxy 344 that encapsulates the distal end of the core 390.

Once inside the cavity 302, the electrical conductors 392 can be spliced back together using any known method in the art. The electrical conductors 392 can also be routed through the spindle 304 and into or through the gimbal assembly 306 until they are connected at, for example, a slip ring (not shown) that provides an electrical connection between the electrical conductors 392 and one or more stationary components of a ground station, such as the exemplary ground stations shown in FIGS. 1-4. The slip ring may take the form of any slip ring known in the art.

To facilitate the routing of the electrical conductors 392 through the spindle 304 and into or through the gimbal assembly 306 to a slip ring, a torsional coupling/cable assembly 346 may be provided. An exemplary torsional coupling/cable assembly is described below with reference to FIG. 9. As shown in FIG. 6, once inside the cavity 302, the electrical conductors 392 are routed and terminated along the termination anchor/spindle axis 350. Accordingly, the core 390 and electrical conductors 392 are both terminated along the same common axis.

Figure 9:
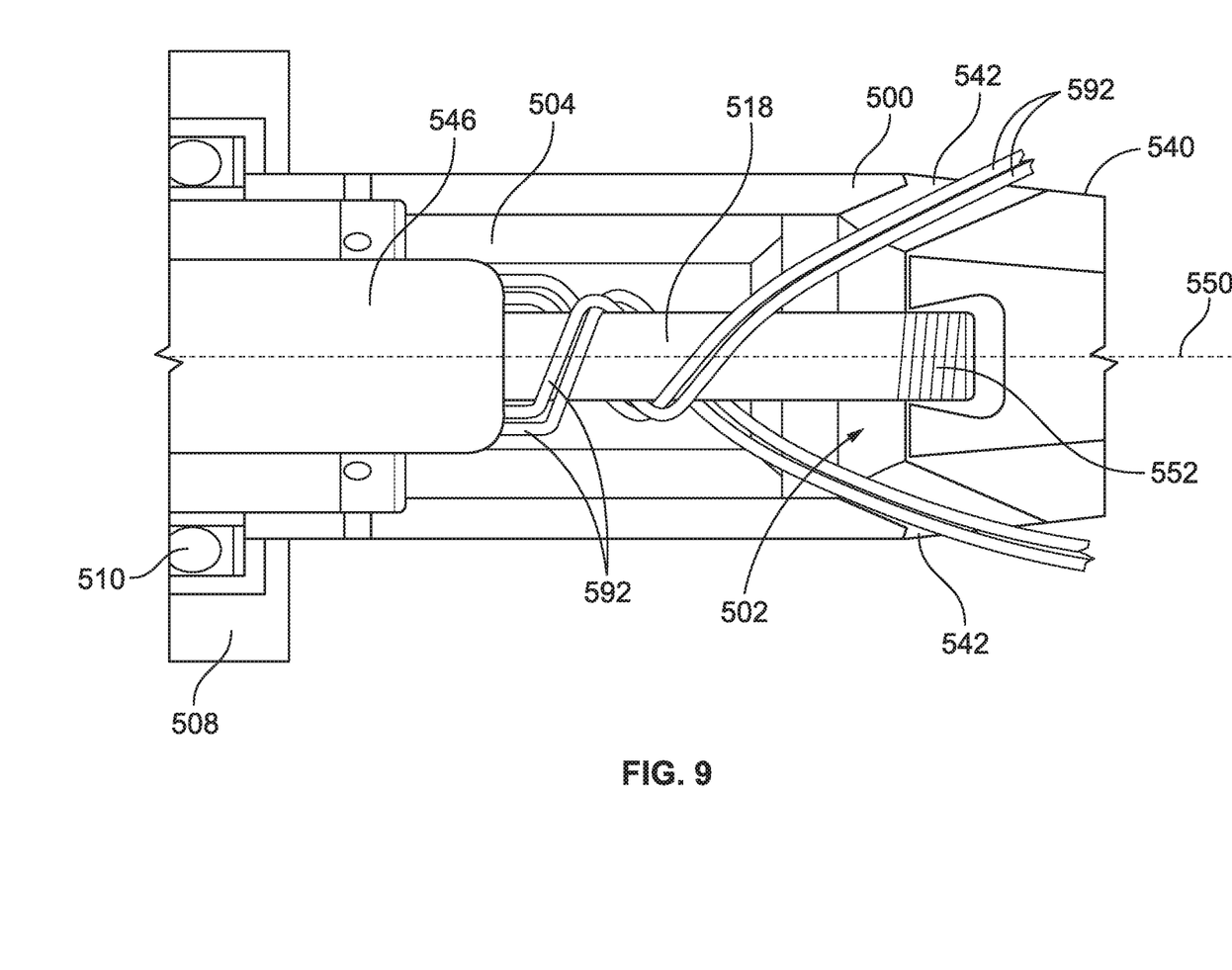
FIG. 9 is a close-up cross-sectional view of an exemplary configuration for terminating electrical conductors 592 of a tether through a tether termination anchor 500 of a tether termination mount.

One embodiment for terminating the electrical conductors inside the tether termination mount is shown in FIG. 9. As shown, the electrical conductors 592 are routed through the openings 542 in the lateral surface 540 of the termination anchor 500. Once inside the cavity 502 of the anchor 500, the conductors 592 may be terminated to a cable assembly that includes a flexible drive shaft 518 and protective covering 546. More specifically, the electrical conductors 592 may be terminated to the flexible drive shaft 518 by being helically wrapped around the drive shaft 518. As shown, the proximal portion of the flexible drive shaft 518 is aligned with the spindle/termination anchor axis 550. The flexible drive shaft 518 may be secured to the termination anchor 500 and/or spindle 504 so that rotation of the anchor/spindle results in rotation of the drive shaft 518, which in turn, results in rotation of the electrical conductors 592 and covering 546. In this embodiment, the flexible drive shaft 518 may include threads 552 that are configured to engage corresponding threads (not shown) on the termination anchor 500. In other embodiments, the drive shaft 518 may be secured to the anchor 500 in a different manner known in the art. For example, a radial clamp may be used between the flexible drive shaft 518 (and/or covering 546) and the inner surface of the spindle 504 (and/or the inner surface of the termination anchor 500).

The above-described systems for terminating a tether will now be described during operation of an AWT. As noted above, an aerial vehicle of an AWT may fly across the wind in a substantially circular path, thus causing the tether to continuously rotate in one direction about the central tether axis. While the aerial vehicle is in flight, the tether may also be under tension. Without a proper system and method for terminating the tether, the tether rotation may cause twisting of the tether, which could, among other things, damage the electrical conductors of the tether. Likewise, the tension in the tether could also damage the electrical conductors. The above-described systems and methods may help to prevent damage to the electrical conductors of the tether.

With reference to FIG. 6, as an aerial vehicle (e.g., aerial vehicle 20 or 120 shown in FIGS. 1-4) flies across the wind in a substantially circular path, the tether 330 continuously rotates about the central tether axis 356 defined by the center of the tether core 390. This tether rotation may cause the termination anchor 300 and spindle 304 to rotate about their common axis 350 as the rotational energy of the tether 330 is transferred to the termination anchor 300 via the epoxy 344 connection between the tether core 390 and the termination anchor 300. As shown, within the tether termination mount 354, the anchor/spindle axis 350 may be coincident with the tether axis 356 because the core 390 may be terminated along the anchor/spindle axis 350 within the cavity 302 of the termination anchor 300. During this rotation, the electrical conductors 392, which are routed along the lateral surface 340 of the termination anchor 300 and into the cavity 302 through the openings 342 in the lateral surface 340, may also rotate about the anchor/spindle axis 350. This coordinated rotation of the tether 330 (core 390 and electrical conductors 392), termination anchor 300, and spindle 304 may reduce the risk of damage to the electrical conductors 392 caused by twisting.

By terminating the tether core 390 and electrical conductors 392 in this manner, tension caused by the aerial vehicle may be focused to the tether core 390. Specifically, as an aerial vehicle is in flight, this configuration allows the tether core 390 to be taut and bear more tensile stress than the electrical conductors 390, which may be less taut than the core 390 or may be provided with some slack. This focusing of tensile stress to the tether core 390 may avoid subjecting the electrical conductors to damaging stresses.

Although the above description focuses on the termination of a tether at a termination mount on a ground station of an AWT, many of the same features may be applied to the opposite end of the tether, which is connected to an aerial vehicle. More specifically, the core and the electrical conductors of the tether may be terminated at different locations such that the core bears more tensile stress than the electrical conductors during flight of the aerial vehicle. Unlike the termination systems and methods described above with respect to the ground station, the termination systems and methods at the aerial vehicle side may not need to accommodate for tether rotation. This is especially true if the termination system used at the ground station already accommodates the tether rotation. Accordingly, the termination system at the aerial vehicle may not include a rotatable termination anchor or spindle.

More specifically, with reference to FIG. 2, a termination anchor similar to the termination anchor 300 of FIG. 6 may be provided at the aerial vehicle 20 side of the tether 30 just proximal to the point 34 where the tether 30 meets the bridles 32a, 32b, and 32c. In such an embodiment, the tether core 390 may be routed into the cavity 302 of the termination anchor 300 and secured along the axis 350 of the termination anchor 300 with epoxy 344. The electrical conductors 392 may then be routed along the later surface 340 of the termination anchor 300 and through the openings 342 so that the electrical conductors 392 may be terminated inside the cavity 302 of the anchor 300 along the same termination anchor axis 350 as shown in FIG. 6. The electrical conductors 392 may then routed along the bridles 32a, 32b, and 32 and on to the aerial vehicle 20. In another embodiment, the electrical conductors 392 may be routed along the later surface 342 of the termination anchor 300 and terminated along the bridles 32a, 32b, and 32 (as opposed to inside the cavity 302 of the termination anchor 300) without entering the cavity 302 of the termination anchor 300.

IV. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An airborne wind turbine, comprising:
an aerial vehicle;
a tether comprising a core and at least one electrical conductor, wherein the tether is coupled to the aerial vehicle; and
a ground station comprising a tether termination mount comprising a rotatable termination anchor, wherein the tether is coupled to the ground station via the termination anchor,
wherein the core of the tether is secured along an axis of the termination anchor at a first location, and
wherein the at least one electrical conductor of the tether is secured along the axis of the termination anchor at a second location.

2. The airborne wind turbine of claim 1, wherein the first location is proximal to the second location.

3. The airborne wind turbine of claim 1, wherein the first location and the second location are inside a cavity of the termination anchor.

4. The airborne wind turbine of claim 3, wherein the core of the tether enters the cavity of the termination anchor at a proximal end of the termination anchor, and wherein the at least one electrical conductor of the tether enters the cavity of the termination anchor on a lateral surface of the termination anchor.

5. The airborne wind turbine of claim 1, wherein, when the tether is under tension, the core of the tether bears a greater tensile stress than the at least one electrical conductor.

* * * * *